United States Patent
Ishikawa et al.

(10) Patent No.: US 8,349,943 B2
(45) Date of Patent: Jan. 8, 2013

(54) PIGMENT DISPERSANT CONTAINING A COPOLYMER WITH CONSTITUENT UNITS DERIVED FROM POLYMERIZABLE MACROMONOMERS

(75) Inventors: Kazuhiro Ishikawa, Wakayama (JP); Kazuo Kuwahara, Wakayama (JP); Hiromi Nambu, Wakayama (JP); Akito Itoi, Wakayama (JP); Yukihiro Fukuyama, Wakayama (JP); Yuki Wakabayashi, Wakayama (JP)

(73) Assignee: Kao Corporation, Tokyo (JP)

( * ) Notice: Subject to any disclaimer, the term of this patent is extended or adjusted under 35 U.S.C. 154(b) by 926 days.

(21) Appl. No.: 12/282,989

(22) PCT Filed: Mar. 14, 2007

(86) PCT No.: PCT/JP2007/055782
§ 371 (c)(1),
(2), (4) Date: Dec. 4, 2008

(87) PCT Pub. No.: WO2007/119462
PCT Pub. Date: Oct. 25, 2007

(65) Prior Publication Data
US 2009/0258975 A1  Oct. 15, 2009

(30) Foreign Application Priority Data

Mar. 15, 2006 (JP) ................................. 2006-070242
Mar. 15, 2006 (JP) ................................. 2006-070243
Jul. 3, 2006 (JP) ................................. 2006-183002

(51) Int. Cl.
*C08L 39/00* (2006.01)

(52) U.S. Cl. ............ 524/555; 523/205; 524/86; 524/92; 524/94; 524/320; 526/303.1; 526/307.2; 526/307.3; 526/310

(58) Field of Classification Search ................. 524/555, 524/86, 92, 94, 320; 526/303.1, 307.2, 307.3, 526/310; 523/205, 206
See application file for complete search history.

(56) References Cited

U.S. PATENT DOCUMENTS

| 5,294,233 | A | 3/1994 | Kitahara et al. |
| 2003/0166775 | A1 | 9/2003 | Takano et al. |

FOREIGN PATENT DOCUMENTS

| EP | 0 388 921 A2 | | 9/1990 |
| JP | 10-339949 | | 12/1998 |
| JP | 2000-234007 | * | 8/2000 |
| JP | 2001031885 A | * | 2/2001 |
| JP | 2002 47441 | | 2/2002 |
| JP | 2002-47441 | | 2/2002 |
| JP | 2002-105379 | | 4/2002 |
| JP | 2002 105379 | | 4/2002 |
| JP | 2003-517063 | | 5/2003 |
| JP | 2003 519703 | | 6/2003 |
| WO | WO 01/44330 A1 | | 6/2001 |
| WO | WO 01/51534 A1 | | 7/2001 |

OTHER PUBLICATIONS

Chinese Office Action issued Feb. 28, 2012 in patent application No. 200780009051.9 with English translation.
Office Action issued Apr. 17, 2012 in Japanese Application No. 2006-183002 (With English Translation).
Extended European Search Report Issued May 4, 2012 in Patent Application No. 07739225.6.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

The present invention provides a nonaqueous pigment dispersant containing a copolymer having: (a) a constituent unit derived from a nitrogen atom-containing polymerizable macromonomer having an ethylenic unsaturated double bond at one terminal, and (b) a constituent unit derived from a monomer unit having an ethylenic unsaturated double bond, being copolymerizable with the nitrogen atom-containing polymerizable macromonomer of constituent (a), and a pigment dispersion composition containing the dispersant, a pigment and a nonaqueous solvent.

20 Claims, No Drawings

US 8,349,943 B2

PIGMENT DISPERSANT CONTAINING A COPOLYMER WITH CONSTITUENT UNITS DERIVED FROM POLYMERIZABLE MACROMONOMERS

CROSS-REFERENCE TO RELATED APPLICATIONS

The present application is a National Stage (371) of PCT/JP2007/055782, filed on Mar. 14, 2007, and claims priority to JP 2006-070242, filed Mar. 15, 2006, JP 2006-070243, filed Mar. 15, 2006, and JP 2006-183002, filed Jul. 3, 2006.

FIELD OF THE INVENTION

The present invention relates to a nonaqueous pigment dispersant for dispersing a pigment in nonaqueous solvent and a pigment dispersion composition.

BACKGROUND OF THE INVENTION

Polymer dispersants have been known to be effective in dispersing pigment in nonaqueous solvent, and such nonaqueous pigment dispersant have been used in producing pigment dispersion compositions for preparation of solvent-based paint compositions. Nonaqueous pigment dispersants have been used widely, for example, as solvent paints for automobile exterior and inks for the color filters of liquid crystal displays. The color filter is a colored pattern formed on a transparent substrate by mixing a pigment dispersion and a light-sensitive composition, coating the mixture, and exposing the formed film to light. In the field of color filter, along with recent improvement in quality of liquid crystal displays, there is an increasing demand for higher color saturation and brightness and accordingly for finer pulverization of the pigment in color filter and increase in the content of the pigment.

Graft polymers are known to be particularly superior in properties as the polymers for such dispersants. For example, JP-A No. 10-339949 discloses a pigment dispersion composition containing a copolymer of an oligomer having an ethylenic unsaturated double bond and a monomer having a nitrogen atom-containing group and an ethylenic unsaturated double bond. Alternatively, JP-A No. 2003-517063 discloses a composition containing a graft polymer composition having amide functional groups in the main chain as the groups for adsorbing pigments.

SUMMARY OF THE INVENTION

The present invention provides a nonaqueous pigment dispersant, containing a copolymer (E) having the following constituent units (a) and (b):
(a) a constituent unit derived from a nitrogen atom-containing polymerizable macromonomer having an ethylenic unsaturated double bond at one terminal, and
(b) a constituent unit derived from a monomer having an ethylenic unsaturated double bond, being copolymerizable with the nitrogen atom-containing polymerizable macromonomer of constituent unit (a).

The present invention is a pigment dispersion composition containing a pigment (A), a nonaqueous solvent (B) and the dispersant.

The present invention is a nonaqueous pigment dispersant containing a polymer (C) having the following constituent units (c1), (c2) and (c3):
(c1) a constituent unit derived from a nitrogen atom-containing polymerizable macromonomer having an ethylenic unsaturated double bond at one terminal,
(c2) a constituent unit derived from a polymerizable macromonomer having an ethylenic unsaturated double bond at one terminal, but no nitrogen atom, and
(c3) a constituent unit derived from a monomer having an ethylenic unsaturated double bond, being copolymerizable with the macromonomer of constituent unit (c1) and the macromonomer of constituent unit (c2) and having a difference ($\Delta$sp) in solubility parameter between the monomer and a nonaqueous solvent (B) of 1.0 or more.

The present invention is a nonaqueous pigment dispersion composition containing a pigment (A), a nonaqueous solvent (B), and a polymer (C) having the following constituent units (c1), (c2) and (c3):
(c1) a constituent unit derived from a nitrogen atom-containing polymerizable macromonomer having an ethylenic unsaturated double bond at one terminal,
(c2) a constituent unit derived from a polymerizable macromonomer having an ethylenic unsaturated double bond, but no nitrogen atom at one terminal, and
(c3) a constituent unit derived from a monomer having an ethylenic unsaturated double bond copolymerizable with the macromonomer of constituent unit (c1) and the macromonomer of constituent unit (c2) and having a difference ($\Delta$sp) in solubility parameter between the monomer and a nonaqueous solvent (B) of 1.0 or more.

The present invention is a method of producing the nonaqueous pigment dispersion composition according to any one of Claims 12 to 20, including the following steps 1, 2 and 3:
step 1: a step of mixing a polymer (C), an organic solvent (D) capable of dissolving the polymer (C), and a pigment (A);
step 2: a step of adding a nonaqueous solvent (B) not dissolving the polymer (C) to the mixture obtained in step 1; and
step 3: a step of removing the organic solvent (D) from the mixture obtained in step 2.

The present invention also is use of the copolymer (E) or the polymer (C) as a dispersant for use in dispersing pigment in nonaqueous solvents.

DETAILED DESCRIPTION OF THE INVENTION

The pigment dispersion compositions disclosed in JP-A No. 10-339949 and JP-A No. 2003-517063 demand a great amount of dispersant for fine pulverization of the pigment, and in addition, it is difficult to pulverize pigments, particularly diketopyrrolopyrrole-based pigments superior in color saturation. Moreover, the dispersion that is not adsorbed on the pigment surface may deteriorate the properties of the resin after photoexposure.

The present invention provides a pigment dispersant capable of dispersing pigment finely in a nonaqueous solvent and a pigment dispersion composition thus obtained. The present invention provides a pigment dispersion composition having a favorable dispersion of a pigment in a nonaqueous solvent in which the dispersant is adsorbed on the pigment's surface and suppressed from dissolving out into the nonaqueous solvent.

The pigment dispersant according to the present invention can disperse pigment finely in nonaqueous solvent.

The pigment dispersion composition according to the present invention having a favorable dispersion of a pigment in a nonaqueous solvent and the dispersant of polymer (C) is adsorbed on the pigment's surface and suppressed from dissolving out into the nonaqueous solvents.

Hereinafter, embodiments of the copolymer (E) according to the present invention will be described.

[Constituent Unit (a)]

The constituent unit (a) of the present invention is a constituent unit derived from a nitrogen atom-containing polymerizable macromonomer having an ethylenic unsaturated double bond at one terminal (hereinafter, referred to as nitrogen-containing macromonomer (a)), and the nitrogen-containing macromonomer (a) is preferably a nitrogen atom-containing polymerizable macromonomer having a (meth)acryloyl or styryl group at one terminal. Examples of the nitrogen-containing macromonomers (a) include polymers obtained from a monomer having an ethylenic unsaturated double bond and nitrogen atoms and poly(N-acylalkyleneimines) having an ethylenic unsaturated double bond at one terminal.

Examples of the monomers having an ethylenic unsaturated double bond and nitrogen atoms include vinylpyridines such as 2-vinylpyridine or 4-vinylpyridine; nitrogen-containing styrene-based monomers such as p-styrene sulfonamide, p-aminostyrene, or aminomethylstyrene; (meth)acrylamides such as (meth)acrylamide, N,N-dialkyl (alkyl group preferable having 1 to 8 carbon atoms, still more preferably 1 to 4) (meth)acrylamides, N-alkyl (alkyl group preferable having 1 to 8 carbon atoms, more preferably 1 to 4) (meth)acrylamides, N,N-dialkyl (alkyl group preferable having 1 to 8 carbon atoms, more preferably 1 to 4), aminoalkyl (alkyl group preferable having of 1 to 6 carbon atoms), (meth)acrylamide 2-methylpropylsulfonic acid, morpholino-(meth)acrylamide, pyperidino-(meth)acrylamide, N-methyl-2-pyrrolidyl(meth)acrylamide, or N,N-methylphenyl-(meth)acrylamide; nitrogen-containing (meth)acrylic esters such as N,N-dialkyl (alkyl group preferable having 1 to 8 carbon atoms, more preferably 1 to 4) aminoalkyl (alkyl group preferable having 1 to 6 carbon atoms) (meth)acrylates, 1-(N,N-dialkyl (alkyl group preferable having 1 to 8 carbon atoms, more preferably 1 to 4) amino)-1,1-dimethylmethyl (meth)acrylates, morpholinoethyl (meth)acrylate, pyperidinoethyl (meth)acrylate, 1-pyrrolidinoethyl (meth)acrylate, N,N-methyl-2-pyrrolidylaminoethyl (meth)acrylate, or N,N-methylphenylaminoethyl (meth)acrylate; and N-vinylpyrrolidone.

The poly(N-acylalkyleneimine) having an ethylenic unsaturated double bond at one terminal is, for example, a poly(N-acylalkyleneimine) having a (meth)acryloyl or styryl group at one terminal and a structural unit represented by General Formula (I):

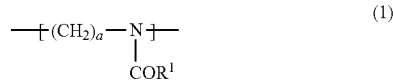

(1)

(wherein, $R_1$ represents an alkyl, alkenyl, aralkyl or aryl group having 1 to 22 carbon atoms, and a is an integer of 2 or 3).

Examples of the poly(N-acylalkyleneimines) include those obtained by cationic ring-opening polymerization of 2-alkyloxazoline and 2-alkyloxazine, as described in JP-B No. 2643403.

Among these nitrogen-containing macromonomers (a), monoterminally (meth)acryloyl-type poly(N-acyl(acyl group having 2 to 9 carbon atoms) alkylene (alkylene group having 2 to 3 carbon atoms) imines), monoterminally (meth)acryloyl-type poly(N-alkyl (alkyl group having 1 to 8 carbon atoms) (meth)acrylamides), monoterminally (meth)acryloyl-type poly(N,N-dialkyl (alkyl group having 1 to 8 carbon atoms) (meth)acrylamides), and monoterminally (meth)acryloyl-type poly(N-vinylpyrrolidones) are preferable; monoterminally methacryloyl-type poly(N-acyl(acyl group having 2 to 4 carbon atoms) alkylene (alkylene group having 2 to 3 carbon atoms) imines), monoterminally methacryloyl-type poly(N,N-dimethylacrylamide), and monoterminally methacryloyl-type poly(N-vinylpyrrolidones) are more preferable; monoterminally methacryloyl-type poly(N-acyl alkylene (alkylene group having 2 to 3 carbon atoms) imines) are still more preferably; and monoterminally methacryloyl-type poly(2-ethyloxazolines) are particularly preferable.

In the present specification, (meth)acryl means acryl or methacryl; (meth)acrylate means acrylate or methacrylate; and (meth)acryloyl means acryloyl or methacryloyl.

The weight-average molecular weight of the nitrogen-containing macromonomer (a) is preferably 300 to 30,000, particularly preferably 500 to 20,000.

The weight-average molecular weight of the nitrogen-containing macromonomer (a) is determined by gel penetration chromatography (GPC).

[Constituent Unit (b)]

The constituent unit (b) of the present invention is a constituent unit derived from a monomer having an ethylenic unsaturated double bond copolymerizable with the nitrogen-containing macromonomer (a) (hereinafter, referred to as monomer (b).

The monomer (b) is not particularly limited in its structure, however, preferably has no nitrogen atom, from the viewpoint of dispersion efficiency in nonaqueous solvents. Examples thereof include polymerizable carboxylic acids such as (meth)acrylic acid; (meth)acrylic esters such as methyl (meth)acrylate, ethyl (meth)acrylate, butyl (meth)acrylate, lauryl (meth)acrylate, stearyl (meth)acrylate, benzyl (meth)acrylate, cyclohexyl (meth)acrylate, or hydroxyethyl (meth)acrylate; styrene derivatives such as styrene or sodium styrenesulfonate; and fatty acid vinyl esters such as vinyl acetate. These compounds may be used alone or in combination of two or more.

Alternatively, so-called macromonomers, polymers of these monomers additionally carrying an ethylenic unsaturated double bond at one terminal, can also be used. Examples of such commercially available macromonomers include monoterminally methacryloyl-substituted polystyrene (Mn=6000, trade name: AS-6, manufactured by Toagosei Co. Ltd.), monoterminally methacryloyl-substituted polymethyl methacrylate (Mn=6000, trade name: AA-6, manufactured by Toagosei Co., Ltd.) and monoterminally methacryloyl-substituted poly-n-butyl acrylate (Mn=6000, trade name: AB-6, manufactured by Toagosei Co., Ltd.).

The monomers (b) preferably include polymerizable macromonomers having an ethylenic unsaturated double bond at one terminal but having no nitrogen atom.

Considering dispersion efficiency, the monomer (b) is preferably more compatible with the nonaqueous solvent used. Specifically, a monomer having a difference in solubility parameter (sp value) of 1 or less from the nonaqueous solvent is preferably used. The solubility parameter is a value calculated by the Fedors method [R. F. Fedors. Polym. Eng. Sci., 14, 147 (1974)]. Examples of the monomers (b) used when propylene glycol monomethylether acetate (sp value=8.73) is used as the nonaqueous solvent include methyl methacrylate (sp value=8.93), ethyl methacrylate (sp value=8.88), n-butyl methacrylate (sp value=8.82), lauryl methacrylate (sp value=8.70), stearyl methacrylate (sp value=8.67) and styrene (sp value=9.24). However, if two or more monomers are copolymerized, a polymer from a monomer having a difference in sp value of 1 or more may be used in the range that does not affect the dispersion efficiency of the polymer in the solvent.

[Nonaqueous Pigment Dispersant]

The nonaqueous pigment dispersant according to the present invention contains a copolymer (E) having constituent units (a) and (b). The rate of the constituent unit (a) in all the constituent units in the copolymer (E) of the present invention is preferably 1 to 70 wt %, more preferably 3 to 60 wt %, and still more preferably 5 to 50 wt %, from the viewpoints of favorable absorption efficiency on pigment, favorable pulverization efficiency and dispersion stability.

The weight-average molecular weight of the copolymer (E) according to the present invention is preferably 1,000 to 100,000, more preferably 3,000 to 100,000, and still more preferably 5,000 to 50,000. The weight-average molecular weight is determined by gel penetration chromatography (GPC).

The production methods for the nonaqueous pigment dispersant according to the present invention include bulk polymerization, solution polymerization, suspension polymerization and emulsification polymerization, and, among them, solution polymerization is particularly preferable. Examples of the solvents used in solution polymerization include alcohols such as methanol, ethanol or isopropanol; ketones such as acetone or methylethylketone; esters such as ethyl acetate or butyl acetate; hydrocarbons such as hexane or cyclohexane; ethers such as diethylether or tetrahydrofuran; and aromatic compounds such as benzene or toluene.

The nonaqueous pigment dispersant according to the present invention can be prepared by radical or ionic polymerization, however, is preferably produced by radical polymerization. A radical polymerization initiator may be used then. Favorable examples of the radical polymerization initiator include azo compounds such as 2,2'-azobisisobutylonitrile, 2,2'-azobis(2,4-dimethylvaleronitrile), dimethyl-2,2'-azobisbutylate, 2,2'-azobis(2-methylbutylonitrile), or 1,1'-azobis(1-cyclohexanecarbonitrile). Alternatively, an organic peroxide such as t-butylperoxy octoate, di-t-butyl peroxide, or dibenzoyloxide may be used.

The amount of the radical polymerization initiator used is preferably 0.001 to 5 moles, more preferably 0.01 to 2 moles, per 1 mole of the monomer mixture.

A polymerization chain-transfer agent may be added during polymerization additionally. Typical examples of the polymerization chain-transfer agents include mercaptans such as octylmercaptan, n-dodecylmercaptan, t-dodecylmercaptan, n-tetradecylmercaptan, mercaptoethanol, 3-mercapto-1,2-propanediol or mercaptosuccinic acid; thiuram disulfides; hydrocarbons; unsaturated cyclic hydrocarbon compounds; and unsaturated heterocyclic compounds, and these agents may be used alone or in combination of two or more.

The polymerization condition of the monomer mixtures may not be determined, as it varies according to the kinds of the radical polymerization initiator, monomers, and solvents used, however, normally, the polymerization temperature is preferably 30 to 100° C., more preferably 50 to 80° C., and the polymerization time is preferably 1 to 20 hours. The polymerization atmosphere is preferably inert gas atmosphere such as of nitrogen or argon.

After polymerization reaction, the nonaqueous pigment dispersant generated can be isolated from the reaction solution, for example, by a known method such as reprecipitation or solvent distillation. Alternatively, the obtained nonaqueous pigment dispersant may be purified by removing unreacted monomers and others, for example, by repeated reprecipitation, membrane separation, chromatographic separation or extraction.

[Pigment Dispersion Composition]

The pigment dispersion composition according to the present invention contains a pigment, a nonaqueous solvent and a dispersant according to the present invention. The rate of the pigment in the pigment dispersion composition is preferably 1 to 30 wt %, more preferably 2 to 20 wt %, for more favorable colorability and viscosity. Alternatively, the rate of the dispersant according to the present invention is preferably 1 to 200 wt %, more preferably 2 to 100 wt %, and still more preferably 5 to 50 wt %, with respect to the pigment, for more favorable viscosity and coat-film physical properties.

The nonaqueous solvent for use in the present invention is not particularly limited, however, particularly when the composition is used as an oil ink for color filters, it is preferably a high-boiling point of organic solvent having a boiling point of 100° C. or higher. Examples of the organic solvents include ethylene glycol alkylethers (cellosolves) such as ethylene glycol monomethylether, ethylene glycol diethylether, and ethylene glycol monoethylether; diethylene glycol alkylethers (carbitols) such as diethylene glycol monomethylether, diethylene glycol dimethylether, or diethylene glycol monoethylether; propylene glycol dialkylethers such as propylene glycol monomethylether or propylene glycol dimethylether; alkylene glycol monoalkylether acetates such as ethylene glycol monomethylether acetate, diethylene glycol monomethylether acetate, or propylene glycol monomethylether acetate; and alcohols such as ethylene glycol, diethylene glycol or glycerol. Among these nonaqueous solvents, alkylene glycol monoalkylether acetates are preferably, and propylene glycol monomethylether acetate is more preferable. The nonaqueous solvent is preferably used in an amount of 100 to 500 wt % with respect to the total solid matters.

The pigment for use in the present invention may be an inorganic or organic pigment. It may be used in combination with an extender pigment as needed.

Examples of the inorganic pigments include carbon black, metal oxides, metal sulfides and metal chlorides.

Examples of the organic pigments include azo pigments, phthalocyanine pigments, fused polycyclic pigments, and lake pigments. Examples of the azo pigments include insoluble azo pigments such as C.I. Pigment Red 3; soluble azo pigments such as C.I. Pigment Red 48:1; and fused azo pigments such as C.I. Pigment Red 144. Examples of the phthalocyanine pigments include copper phthalocyanine pigments such as C.I. Pigment Blue 15:6. Examples of the fused polycyclic pigments include anthraquinone pigments such as C.I. Pigment Red 177; perylene pigments such as C.I. Pigment Red 123; perynone pigments such as C.I. Pigment Orange 43; quinacridone pigments such as C.I. Pigment Red 122; dioxazine pigments such as C.I. Pigment Violet 23; isoindolinone pigments such as C.I. Pigment Yellow 109; isoindoline pigments such as C.I. Pigment Orange 66; quinophtharone pigments such as C.I. Pigment Yellow 138; indigo pigments such as C.I. pigment red 88; metal complex pigments such as C.I. Pigment Green 8; diketopyrrolopyrrole-based pigments such as C.I. Pigment Red 254, C.I. Pigment Red 255, or C.I. Pigment Orange 71.

Among the pigments, diketopyrrolopyrrole-based organic pigments are preferable and C.I. Pigment Red 254 is particularly preferable.

The pigment dispersion composition according to the present invention may contain, in addition to the components, a binder, a multifunctional monomer, a photopolymerization initiator or the like.

Examples of the binders include copolymers (E) of (meth) acrylic acid and a (meth)acrylic ester; styrene/maleic anhydride copolymers and reaction products of a styrene/maleic anhydride copolymer and an alcohol. The weight-average molecular weight thereof is preferably 5,000 to 200,000. The content of the binder in the pigment dispersion composition according to the present invention is preferably 20 to 80 wt % with respect to the total solid matters.

Examples of the multifunctional monomers include (meth) acrylic esters, urethane (meth)acrylates, (meth)acrylic amides and allyl compounds, vinyl esters having two or more ethylenic unsaturated double bonds. The content of the multifunctional monomer in the pigment dispersion composition according to the present invention is preferably 10 to 60 wt % with respect to the total solid matters.

Examples of the photopolymerization initiators include aromatic ketones, Rofin dimers, benzoin, benzoin ethers, and polyhalogens, and these compounds may be used alone or in combination of two or more. In particular, a combination of 4,4'-bis(diethylamino)benzophenone and 2-(o-chlorophenyl)-4,5-diphenylimidazole dimer and 4-[p-N,N-di(ethoxycarbonylmethyl)-2,6-di(trichloromethyl)-s-triazine] are preferable. The content of the photopolymerization initiator in the pigment dispersion composition according to the present invention is preferably 0.2 to 10 wt % with respect to the total solid matters.

The pigment dispersion composition according to the present invention can be prepared by mixing a pigment dispersant according to the present invention with a colorant and a nonaqueous solvent.

The method of mixing the pigment dispersion composition is not particularly limited, and, for example, kneading machines such as roll mill, bead mill, kneader or extruder; homo-valve high-pressure homogenizer such as High-Pressure Homogenizer (Izumi Food Machinery Co., Ltd., trade name) or Minilab 8.3H (Rannie, trade name); chamber-type high-pressure homogenizers such as Microfluidizer (Microfluidics, trade name), Nanomizer (Nanomizer, trade name), Ultimizer (Sugino Machine Co., Ltd., trade name), Genus PY (Hakusui Kagaku Kogyosho Co., Ltd, trade name), and DeBEE2000 (Japan PEE Co., Ltd., trade name), and the like are used favorably.

Hereinafter, favorable embodiments of the nonaqueous pigment dispersants containing a polymer (C) according to the present invention will be described.

[Pigment (A)]

The pigment for use in the present invention may be an inorganic pigment or an organic pigment. It may be used as needed in combination with an extender pigment.

Examples of the inorganic pigments include carbon black, metal oxides, metal sulfides and metal chlorides.

Examples of the organic pigments include azo pigments, phthalocyanine pigments, fused polycyclic pigments, and lake pigments. Examples of the azo pigments include insoluble azo pigments such as C.I. Pigment Red 3; soluble azo pigments such as C.I. Pigment Red 48:1; and fused azo pigments such as C.I. Pigment Red 144. Examples of the phthalocyanine pigments include copper phthalocyanine pigment such as C.I. Pigment Blue 15:6. Examples of the fused polycyclic pigments include anthraquinone pigments such as C.I. Pigment Red 177; perylene pigments such as C.I. Pigment Red 123; perynone pigments such as C.I. Pigment Orange 43; quinacridone pigments such as C.I. Pigment Red 122; dioxazine pigments such as C.I. Pigment Violet 23; isoindolinone pigments such as C.I. Pigment Yellow 109; isoindoline pigments such as C.I. Pigment Orange 66; quinophtharone pigments such as C.I. Pigment Yellow 138; indigo pigments such as C.I. Pigment Red 88; metal complex pigments such as C.I. Pigment Green 8; and diketopyrrolopyrrole-based pigments such as C.I Pigment Red 254, C.I. Pigment Red 255 or C.I. Pigment Orange 71.

Among the pigments, diketopyrrolopyrrole-based pigments are preferable and C.I. Pigment Red 254 is particularly preferable.

[Nonaqueous Solvent (B)]

The nonaqueous solvent for use in the present invention is not particularly limited, however, particularly when the composition is used as an oil ink for color filters, it is preferably a high-boiling point organic solvent having a boiling point of 100° C. or higher. Examples of such organic solvents include ethylene glycol alkylethers (cellosolves) such as ethylene glycol monomethylether, ethylene glycol diethylether, or ethylene glycol monoethylether; diethylene glycol alkylethers (carbitols) such as diethylene glycol monomethylether, diethylene glycol dimethylether or diethylene glycol monoethylether; propylene glycol dialkylethers such as propylene glycol monomethylether or propylene glycol dimethylether; alkylene glycol monoalkylether acetates such as ethylene glycol monomethylether acetate, diethylene glycol monomethylether acetate, or propylene glycol monomethylether acetate; and alcohols such as ethylene glycol, diethylene glycol and glycerin. Among these nonaqueous solvents, alkylene glycol monoalkylether acetates are preferable, and propylene glycol monomethylether acetate is more preferable. The nonaqueous solvent is preferably used in an amount of 100 to 500 wt % with respect to the total solid matters in the pigment dispersion composition.

[Polymer (C)]

The polymer (C) for use in the present invention contains the constituent units (c1), (c2) and (c3).

The unit (c1) is the same as the unit (a) above.

The units (c2) and (c3) and the following unit (c4) are included in the unit (b).

The nitrogen atom-containing polymerizable macromonomer having an ethylenic unsaturated double bond at one terminal used as the constituent unit (c1) (hereinafter, referred to as nitrogen-containing macromonomer (c1)) is preferably a nitrogen atom-containing polymerizable macromonomer having a (meth)acryloyl or styryl group at one terminal. Examples of such nitrogen-containing macromonomers (c1) include polymers from a monomer having an ethylenic unsaturated double bond and nitrogen atoms and poly(N-acylalkyleneimines) having an ethylenic unsaturated double bond at one terminal.

Examples of the monomers having an ethylenic unsaturated double bond and nitrogen atoms are described above.

Examples of the poly(N-acylalkyleneimine) having an ethylenic unsaturated double bond at one terminal include, as described above, poly(N-acylalkyleneimines) having a (meth)acryloyl or styryl group at one terminal and a structural unit represented by General Formula (I).

Favorable examples of the nitrogen-containing macromonomers (c1) were already described.

The polymerizable macromonomer having an ethylenic unsaturated double bond at one terminal but no nitrogen atom (hereinafter, referred to as macromonomer (c2)) for the constituent unit (c2) is preferably a macromonomer having a (meth)acryloyl or styryl group at one terminal. Favorable examples of the macromonomers (c2) include macromonomers of polystyrene and polyalkyl (meth)acrylates (alkyl group having 1 to 4 carbon atoms) such as polymethyl (meth) acrylate, poly-n-butyl (meth)acrylate, or poly-1-butyl (meth) acrylate that have a (meth)acryloyl group bound to one terminal. Example of the commercially available polymerizable macromonomers include monoterminally methacryloyl-substituted polystyrene (Mn=6000, trade name: AS-6, manufactured by Toagosei Co., Ltd.), monoterminally methacryloyl-substituted polymethyl methacrylate (Mn=6000, trade name: AA-6, manufactured by Toagosei Co., Ltd.), and monoterminally methacryloyl-substituted poly-n-butyl acrylate (Mn=6000, trade name: AB-6, manufactured by Toagosei Co., Ltd.).

The monomer for the constituent unit (c3) (hereinafter, referred to as monomer (c3)) is a monomer having an ethylenic unsaturated double bond copolymerizable with the nitrogen-containing macromonomer (c1) and the macromonomer (c2) and having a difference ($\Delta$sp) in solubility parameter between the monomer and the nonaqueous solvent (B) of 1.0 or more. $\Delta$sp is preferably 2 or more, more preferably 3 or more, and particularly preferably 4 or more.

The solubility parameter is a value calculated according to the Fedors method [R. F. Fedors. Polym. Eng. Sci., 14, 147 (1974)] (unit: $cal^{1/2} \cdot cm^{-3/2}$).

The monomer (c3) preferably has polar groups, and the polar group is preferably a carboxyl, amido, or alcoholic hydroxyl group. Typical favorable examples thereof include (meth)acrylic acids, (meth)acrylic amides, and alcoholic hydroxyl group-containing (meth)acrylic acids, and in particular, alcoholic hydroxyl group-containing (meth)acrylic esters are preferable. Two or more polar groups are preferably present in the monomer (c3).

Typical examples of the monomers (c3) when propylene glycol monomethylether acetate (PGMEA, sp value 8.73) is used as the nonaqueous solvent (B) include methacrylic acid (sp value: 10.73), acrylic acid (sp value: 11.08), dimethylacrylamide (sp value: 10.59), acrylamide (sp value: 10.64), 2-hydroxyethyl methacrylate (sp value: 12.06), and glycerol monomethacrylate (sp value: 13.30), and 2-hydroxyethyl methacrylate and glycerin monomethacrylate are preferable.

The polymer (C) according to the present invention may be copolymerized with a monomer copolymerizable with the nitrogen-containing macromonomer (c1) and the macromonomer (c2) and having an ethylenic unsaturated double bond that has a difference ($\Delta$sp) in solubility parameter between the monomer and the nonaqueous solvent (B) of less than 1.0 (hereinafter, referred to as monomer (c4)), in the range that does not impair the advantageous effects of the present invention.

The rate of the constituent unit (c1) to all the constituent units in polymer (C) is preferably 2 to 50 wt %, more preferably 3 to 45 wt %, for improvement in adsorption efficiency on pigment and dispersion stability of the resulting pigment.

The rate of the constituent unit (c2) to all the constituent units in polymer (C) is preferably 20 to 95 wt %, more preferably 30 to 90 wt %, and still more preferably 40 to 85 wt %,
for improvement in dispersion in the nonaqueous solvent (B).

The rate of the constituent unit (c3) to all the constituent units in polymer (C) is preferably 3 to 50 wt %, more preferably 5 to 40 wt %, and still more preferably 7 to 35 wt %,
for improvement in adhesion of the polymer (C) onto the pigment surface.

The rate of the constituent unit (c4) in polymer (C) is preferably 60 wt. parts or less with respect to 100 wt. parts of the constituent unit (c3) for maintaining a low solubility of the polymer (C) in the nonaqueous solvent (B).

The weight-average molecular weight of the polymer (C) is preferably 1,000 to 100,000, more preferably 5,000 to 50,000. The weight-average molecular weight is determined by gel penetration chromatography (GPC).

The polymer (C) may be produced, for example, by bulk polymerization, solution polymerization, or suspension polymerization, however, among them, solution polymerization is particularly preferable. Examples of the solvents used in solution polymerization include alcohols such as methanol, ethanol, or isopropanol; ketones such as acetone or methylethylketone; esters such as ethyl acetate or butyl acetate; hydrocarbons such as hexane or cyclohexane; ethers such as diethylether or tetrahydrofuran; aromatic compounds such as benzene or toluene; and halogenated hydrocarbons such as dichloromethane or chloroform.

[Pigment Dispersion Composition]

The pigment dispersion composition according to the present invention contains a pigment (A), a nonaqueous solvent (B) and a polymer (C). The content of the pigment (A) in the pigment dispersion composition is preferably 1 to 30 wt %, more preferably 2 to 20 wt %, for favorable colorability and viscosity, and the content of the polymer (C) is preferably 1 to 200 wt %, more preferably 2 to 100 wt %, and still more preferably 5 to 50 wt %, with respect to the pigment (A) for more favorable viscosity and coat film physical properties.

The pigment dispersion composition according to the present invention may contain, in addition to the components, a binder, a multifunctional monomer, a photopolymerization initiator or the like.

Examples of the binders, multifunctional monomers and photopolymerization initiators are described above.

[Production Method for Pigment Dispersion Composition]

The production method for the pigment dispersion composition according to the present invention includes the steps 1, 2 and 3. In the step 1, a pigment (A) and a polymer (C) are dispersed in an organic solvent (D) in which the polymer (C) is dissolved or forms a fine micellar structure. The organic solvent (D) used then is not particularly limited, however, considering the distillation for removal of the solvent, it preferably has a boiling point lower than that of the nonaqueous solvent (B), more preferably a boiling point of lower than 100° C.

Examples of the organic solvents (D) include alcohols such as methanol, ethanol or isopropanol; ketones such as acetone or methylethylketone; esters such as ethyl acetate or butyl acetate; hydrocarbons such as hexane or cyclohexane; ethers such as diethylether or tetrahydrofuran; aromatic compounds such as benzene or toluene; and halogenated hydrocarbons such as dichloromethane or chloroform. These solvents may be used in combination of two or more, and may be mixed with the nonaqueous solvent (B) for adjustment of the polymer solubility.

The method of mixing in the step 1 is not particularly limited, and, for example, kneading machines such as roll mill, bead mill, kneader, or extruder; homo-valve high-pressure homogenizer such as High-Pressure Homogenizer (Izumi Food Machinery Co., Ltd., tradename) and Minilab 8.3H (Rannie, trade name); chamber-type high-pressure homogenizers such as Microfluidizer (Microfluidics, trade name), Nanomizer (Nanomizer, trade name), Ultimizer (Sugino Machine Co., Ltd., trade name), Genus PY (Hakusui Kagaku Kogyosho Co., Ltd, trade name), and DeBEE2000 (Japan PEE Co., Ltd., trade name), and the like are used favorably.

The pigment's concentration may be selected arbitrary, however, preferably 1 to 30 wt %, more preferably 2 to 20 wt %, for shortening a removing time of the organic solvent (D) in the step 3 and the entire processing time and for suppressing the viscosity from increasing and improving handling at shifting to the subsequent step. The amount of the polymer (C) is preferably 1 to 200 wt %, more preferably 2 to 100 wt %, and still more preferably 5 to 50 wt %, with respect to the pigment (A), for prevention of increase in viscosity of the pigment dispersion and of adverse effects on the physical properties of the final product.

The step 2 is a step of adding a nonaqueous solvent (B) not dissolving the polymer (C) to the pigment dispersion prepared in the step 1, and the nonaqueous solvent (B) is preferably added dropwise. The compositional rate of the nonaqueous solvent (B) to the organic solvent (D) after the dropwise addition may be determined arbitrarily according to the desired solubility of the polymer, however, the rate of nonaqueous solvent (B)/organic solvent (D) is preferably 1/2 to 20/1, more preferably 1/1 to 10/1.

The organic solvent (D) in the pigment dispersion prepared in the step 2 is removed in the step 3, to give the desired pigment dispersion composition. The method of removing the organic solvent (D) is not particularly limited, and, for example, it is possible to remove the organic solvent (D) by heating under reduced pressure. Part of the nonaqueous solvent (B) may also be removed during removal of the organic solvent (D). After removal of the organic solvent (D), a dispersing machine described above or an ultrasonic dispersing machine may be used for pulverization of secondary aggregates.

It is possible to produce a pigment dispersion composition wherein the polymer (C) is adsorbed on the surface of the pigment (A) by the processing in the steps 1, 2 and 3.

EXAMPLES

The following Examples describe specific embodiments of the present invention. The following Examples are aimed at describing the present invention and not intended to restrict the present invention.

Preparative Examples 1 to 8 and Examples 1 to 4 describe embodiments related to the polymer (C) according to the present invention, while Preparative Examples 9 to 11 and Examples 5 to 10 describe embodiments related to the copolymer (E) according to the present invention.

In the following Preparative Examples, Examples and Comparative Examples, "part" and "%" mean "part by weight" and "wt %", unless specified otherwise.

Preparative Example 1

Synthesis of monoterminally methacryloyl-type poly(2-ethyloxazoline)

300 g of dehydrated ethyl acetate (Wako Pure Chemical Industries, Ltd. reagent) and 132 g of 2-ethyloxazoline (Tokyo Chemical industries Co., Ltd. reagent) were placed in a round-bottomed flask; 65 g of a synthetic zeolite adsorbent Zeorum A-4 (manufactured by Tosoh Corporation) was added thereto; the mixture was stirred at room temperature for 4 hours; and Zeorum was removed by filtration, to give a dehydrated 2-ethyloxazoline solution.

Subsequently, 380 g of the dehydrated 2-ethyloxazoline solution prepared and 17.9 g diethylsulfuric acid were placed in a four-necked flask equipped with a reflux condenser, a thermometer, a nitrogen-gas inlet tube and a stirrer, and the mixture was stirred at 80° C. for 12 hours under dry nitrogen. The reaction solution was cooled to 40° C. or lower; N,N-dimethylaminoethyl methacrylate (Wako Pure Chemical industries, Ltd., reagent) previously dehydrated with Zeorum was added thereto; the mixture was stirred at room temperature for 4 hours; the product was reprecipitated and recovered with a large volume of hexane, to give monoterminally methacryloyl-type poly(2-ethyloxazoline). The weight-average molecular weight of the macromonomer, as determined by GPC (solvent: chloroform), was 1000.

Preparative Example 2

Synthesis of Monoterminally ethacryloyl-ype olymethyl ethacrylate 200 g of methyl methacrylate monomer, 13 g of 3-mercaptopropionic acid and 100 g of toluene were placed in a 2 L separable flask equipped with a reflux condenser, a thermometer, a nitrogen-gas inlet tube and a stirrer, and the internal air was substituted with dry nitrogen.

Then, the nitrogen-gas inlet tube was replaced with a dropping funnel containing 800 g of methyl methacrylate, 52 g of 3-mercaptopropionic acid, 400 g of toluene, and 8 g of 2,2'-azobis(2,4-dimethylvaleronitrile) (manufactured by Wako Pure Chemical Industries, Ltd., trade name: "V-65"); and the monomer solution was added dropwise over 3 hours at 75° C. while the mixture was agitated. After agitation for one more hour at 75° C., 6.48 g of 3-mercaptopropionic acid, 8 g of 2,2'-azobis(2,4-dimethylvaleronitrile) and 400 g of toluene were added. The mixture was then agitated at 75° C. for 2 hours and then cooled.

Then under air bubbling, 22.15 g of tetrabutylammonium bromide and 3.41 g of p-methoxyphenol were added; after the mixture was heated to 110° C., 97.67 g of glycidyl methacrylate was added; and the mixture was stirred for 8 hours. The solid matter content in the polymer solution, as determined from the difference in weight before and after drying at −90 kPa and 110° C. for 12 hours, was 67%, and the weight-average molecular weight (Mw) of the polymer, as determined by GPC (solvent: chloroform), was 3350 (as polystyrene).

Preparative Example 3

35 g of the monoterminally methacryloyl-type poly(2-ethyloxazoline) synthesized in Preparative Example 1, 35 g of monoterminally methacryloyl-type polymethyl methacrylate (AA-6, weight-average molecular weight: 12000, manufactured by Toagosei Co., Ltd., PMMA macromonomer), 10 g of 2-hydroxyethyl methacrylate (HEMA, Wako Pure Chemical Industries, Ltd.), 1 g of 2,2'-azobis(2,4-dimethylvaleronitrile) (V-65; Wako Pure Chemical Industries, Ltd) and 54 g of methylethylketone/isopropanol (1/1 by weight) liquid mixture were mixed uniformly and dissolved uniformly in a beaker, to give a monomer solution.

Subsequently, 13 g of the monomer solution was placed in separable flask equipped with a reflux condenser, a thermometer, a nitrogen-supplying tube, and a stirrer, and the internal air was substituted with nitrogen. After the nitrogen-gas inlet tube was replaced with a dropping funnel containing 122 g of the monomer solution, the monomer solution was added dropwise over 2 hours while the mixture was stirred at 70° C. After stirring at 70° C. additionally for 1 hour, the mixture was heated to 75° C., and 1 g of V-65 and 10 g of methylethylketone/isopropanol (1/1) liquid mixture were added thereto. After stirring at 75° C. additionally for 2 hours, the mixture was cooled and reprecipitated and recovered with a a large volume of hexane, to give poly(hydroxyethyl methacrylate-g-(2-ethyloxazoline)-g-methyl methacrylate). The weight-average molecular weight of the polymer, as determined by GPC (solvent: dimethylformamide), was 46000 (as polystyrene).

Preparative Example 4

Poly(hydroxyethyl methacrylate-g-(2-ethyloxazoline)-g-methyl methacrylate) was obtained in a similar manner to Preparative Example 2, except that the amount of the monoterminally methacryloyl-type poly(2-ethyloxazoline) used in Preparative Example 3 was changed from 35 g to 10 g, the amount of HEMA from 10 g to 5 g, and the amount of methylethylketone/isopropanol (1/1 by weight) liquid mixture from 54 g to 43 g. The weight-average molecular weight of the polymer, as determined by GPC (solvent: dimethylformamide), was 32000 (as polystyrene).

Preparative Example 5

Poly(methyl methacrylate-g-(2-ethyloxazoline)-g-methyl methacrylate) was obtained in a similar manner to Preparative Example 2, except that the amount of monoterminally methacryloyl-type poly(2-ethyloxazoline) used in Preparative Example 3 was changed from 35 g to 20 g and the amount of the PMMA macromonomer from 35 g to 20 g, HEMA was replaced with 20 g of methyl methacrylate (MMA), and the methylethylketone/isopropanol (1/1 by weight) liquid mixture was replaced with 40 g of ethyl acetate 40 g. The weight-average molecular weight of the polymer, as determined by GPC (solvent: chloroform), was 43000 (as polystyrene).

Preparative Example 6

45 g of N,N-dimethylacrylamide (DMAAm, Wako Pure Chemical Industries, Ltd.), 122 g of 45% PMMA macromonomer toluene solution (45% AA-6, weight-average molecular weight: 12000, manufactured by Toagosei Co., Ltd.), 1 g of V-65 and 83 g of propylene glycol monomethyl-ether acetate (PGMEA) were mixed and dissolved uniformly in a beaker, to give a monomer solution.
Then, 25 g of the monomer solution was placed in a separable flask equipped with a reflux condenser, a thermometer, a nitrogen-gas inlet tube, and a stirrer, and the internal air was substituted with nitrogen. After the nitrogen-gas inlet tube was replaced with a dropping funnel containing 225 g of the monomer solution, the monomer solution was added dropwise over 3 hours while the mixture was agitated at 75° C., and the mixture was agitated at 75° C. additionally for 1 hour; and then 1 g of V-65 and 10 g of PGMEA were added thereto. The mixture was agitate at 75° C. additionally for 2 hours, to give 40% poly(N,N-dimethylacrylamide-g-methyl methacrylate) solution. The weight-average molecular weight of the polymer, as determined by GPC (solvent: THF), was 40000 (as polystyrene)

Preparative Example 7

5 g of monoterminally methacryloyl-type poly(2-ethyloxazoline) synthesized in Preparative Example 1, 35 g of PMMA macromonomer (AA-6, weight-average molecular weight: 12000, manufactured by Toagosei Co., Ltd.), 10 g of glycerin monomethacrylate (GMA, Blemmer GLM, NOF Corporation), 1 g of 2,2'-azobis(2,4-dimethylvaleronitrile) (V-65; Wako Pure Chemical Industries, Ltd.) and 38 g of methylethylketone/isopropanol (1/1 by weight) liquid mixture were mixed and dissolved uniformly in a beaker, to give a monomer solution.
Then, 9 g of the monomer solution was placed in a separable flask equipped with a reflux condenser, a thermometer, a nitrogen-gas inlet tube, and a stirrer, and the internal air was substituted with nitrogen. After the nitrogen-gas inlet tube was replaced with a dropping funnel containing 80 g of the monomer solution, the monomer solution was added dropwise over 1.5 hours while the mixture was agitated at 70° C. After agitation at 70° C. for one more hour, the solution was heated to 75° C. and 1 g of V-65 and 5 g of methylethylketone/isopropanol (1/1) liquid mixture were added thereto. After agitation at 75° C. additionally for 3 hours, the mixture was cooled, and reprecipitated and recovered with a large volume of hexane, to give poly(glycerin monomethacrylate-g-(2-ethyloxazoline)-g-methyl methacrylate). The weight-average molecular weight of the polymer, as determined by GPC (solvent: dimethylformamide), was 16000 (as polystyrene).

Preparative Example 8

Poly (hydroxyethyl methacrylate-g-(2-ethyloxazoline)-g-methyl methacrylate) was prepared in a similar manner to Preparative Example 2, except that, the amount of the monoterminally methacryloyl-type poly(2-ethyloxazoline) used in Preparative Example 3 was changed from 35 g to 5 g and the amount of HEMA from 10 g to 25 g, the monoterminally methacryloyl-type polymethyl methacrylate from 35 g of AA-6 to 105 g of the polymer/toluene solution of Preparative Example 2 (polymer content: 70 g), and the amount of the methylethylketone/isopropanol (1/1 by weight) liquid mixture from 54 g to 115 g. The weight-average molecular weight of the polymer, as determined by GPC (solvent: dimethylformamide), was 43000 (as polystyrene).

The compositions of the polymers obtained in Preparative Examples 3 to 8 and the differences ($\Delta sp$) in solubility between the monomer (c3) or (c4) and the nonaqueous solvent (B) when PGMEA was used as the nonaqueous solvent (B) are summarized in Table 1.

TABLE 1

| | | Preparation example 3 | Preparation example 4 | Preparation example 5 | Preparation example 6 | Preparation example 7 | Preparation example 8 |
|---|---|---|---|---|---|---|---|
| Nitrogen-containing macromonomer (c1) | Kind | Macromonomer of preparative example 1 | Macromonomer of preparative example 1 | Macromonomer of preparative example 1 | — | Macromonomer of preparative example 1 | Macromonomer of preparative example 1 |
| | wt %*[1] | 44 | 20 | 33 | — | 10 | 10 |
| Macromonomer (c2) | Kind | PMMA macromonomer | PMMA macromonomer | PMMA macromonomer | PMMA macromonomer | PMMA macromonomer | PMMA macromonomer (Mw = 3350) |
| | wt %*[1] | 44 | 70 | 33 | 55 | 70 | 70 |
| Monomer(c3) | Kind | HEMA | HEMA | — | DMAAm | GMA | HEMA |
| | wt %*[1] | 12 | 10 | — | 45 | 20 | 25 |

TABLE 1-continued

|  |  | Preparation example 3 | Preparation example 4 | Preparation example 5 | Preparation example 6 | Preparation example 7 | Preparation example 8 |
|---|---|---|---|---|---|---|---|
| Monomer(c4) | Kind | — | — | MMA | — | — | — |
|  | wt %*[1] | — | — | 34 | — | — | — |
| Weight-average molecular weight of polymer (C) |  | 46000 | 32000 | 43000 | 40000 | 16000 | 43000 |
| Nonaqueous solvent (B) |  | PGMEA | PGMEA | PGMEA | PGMEA | PGMEA | PGMEA |
| Difference in solubility parameter between monomer (c3) or (c4) and nonaqueous solvent(B) (Δsp) |  | 3.33 | 3.33 | 0.2 | 1.86 | 4.57 | 3.33 |

*[1]Rate of each monomer to the total amount of monomers

Example 1

17 g of C.I. Pigment Red 254, 6.8 g of the polymer of Preparative Example 3, 76.2 g of methylethylketone (MEK), and 200 g of zirconia beads having a diameter of 0.3 mm were placed in a 250 cc plastic bottle, and the mixture was shaken in a paint shaker (manufactured by Asada Iron Works. Co., Ltd.) for 3 hours, to give a pigment dispersion. 30 g of methylethylketone was added to 10 g of the pigment dispersion, and the mixture was agitated. After the system became homogeneous, 50 g of propylene glycol monomethylether acetate (PGMEA) was added gradually dropwise while the mixture was agitated. The liquid mixture was concentrated in an evaporator. The solution obtained was treated in an ultrasonic homogenizer (manufactured by Nippon Seiki Co., Ltd.), and a small amount of the aggregates was removed by filtration, to give a pigment dispersion composition.

Example 2

A pigment dispersion composition was prepared in a similar manner to Example 1, except that the polymer of Preparative Example 3 was replaced with 6.8 g of the polymer obtained in Preparative Example 4.

Example 3

A pigment dispersion composition was prepared a similar manner to Example 1, except that the polymer of Preparative Example 3 was replaced with 6.8 g of the polymer obtained in Preparative Example 7.

Example 4

A pigment dispersion composition was prepared a similar manner to Example 1, except that the polymer of Preparative Example 3 was replaced with 6.8 g of the polymer obtained in Preparative Example 8.

Comparative Example 1

17 g of C.I. Pigment Red 254, 6.8 g of the polymer of Preparative Example 5, 66 g of PGMEA, and 200 g of zirconia beads having a diameter of 0.3 mm were placed in a 250 cc plastic bottle, and shaken in a paint shaker (manufactured by Asada Iron Works. Co., Ltd.) for 3 hours, to give a pigment dispersion composition.

Comparative Example 2

A pigment dispersion composition was prepared in a similar manner to Comparative Example 1, except that the polymer of Preparative Example 5 was replaced with 17 g of the polymer solution obtained in Preparative Example 6.

Comparative Example 3

A pigment dispersion composition was prepared in a similar manner to Comparative Example 1, except that the polymer of Preparative Example 5 was replaced with 6.8 g of Ajisper PB-821 (manufactured by Ajinomoto Co., Inc., polyallylamine fatty acid amide).

The dispersed particle diameter and the adsorption rate of the pigment dispersion compositions obtained Examples 1 to 4 and Comparative Examples 1 to 3 were determined by the following methods. Results are summarized in Table 2.

<Measurement of Dispersed Particle Diameter>

A pigment dispersion composition immediately after preparation was diluted 500 times with PGMEA, and the diameter of the particles dispersed therein was determined by using a particle diameter analyzer Microtrac UPA, MODEL 9340-UPA (manufactured by HONEYWELL).

<Measurement of Adsorption Rate>

A pigment dispersion composition prepared was diluted with PGMEA to a pigment concentration of 5%, and the dilute dispersion was centrifuged in Himac CP56G (manufactured by HitachiKoki Co., Ltd.) at 30,000 rpm for 3 hours. The solid matter contents of the dispersion before centrifugation and that of the supernatant liquid were determined by using an infrared moisture meter FD-240 (manufactured by Kett Electric Laboratory), and the adsorption rate of the polymer on the pigment surface was calculated according to the following Formula:

$$\text{Adsorption rate }(\%) = 100 - \frac{\text{The solid matter contents of the supernatant liquid}}{\left(\begin{array}{c}\text{The solid matter}\\\text{contents before}\\\text{centrifugation}\end{array}\right) \times \left(\frac{\text{The amount of added polymer}}{\begin{array}{c}\text{The amount of added solid matters}\\\text{(pigment + polymer)}\end{array}}\right)} \times 100$$

TABLE 2

|  | Example 1 | Example 2 | Example 3 | Example 4 | Comparative example 1 | Comparative example 2 | Comparative example 3 |
|---|---|---|---|---|---|---|---|
| Polymer | Polymer in preparative example 3 | Polymer in preparative example 4 | Polymer in preparative example 7 | Polymer in preparative example 8 | Polymer in preparative example 5 | Polymer in preparative example 6 | Ajisper PB-821 |
| Organic solvent (D) | MEK | MEK | MEK | MEK | — | — | — |
| Nonaqueous solvent (B) | PGMEA | PGMEA | PGMEA | PGMEA | PGMEA | PGMEA | PGMEA |
| Particle diameter (μm) | 0.25 | 0.18 | 0.10 | 0.10 | 0.46 | 0.42 | 0.18 |
| Adsorption rate (%) | 75 | 62 | 100 | 52 | 20 | 32 | 35 |

The results in Table 2 indicate that the pigments in the nonaqueous pigment dispersion compositions according to the present invention are dispersed finely in the nonaqueous solvent and the polymer was adsorbed on the pigment surface in a greater amount.

Preparative Example 9

Synthesis of Monoterminally methacryloul-type poly(2-ethyloxazoline)

300 g of dehydrated ethyl acetate (Wako Pure Chemical Industries, Ltd. reagent) and 132 g of 2-ethyloxazoline (Tokyo Chemical industries Co., Ltd. reagent) were placed in a round-bottomed flask; 65 g of a synthetic zeolite adsorbent Zeorum A-4 (manufactured by Tosoh Corporation) was added thereto; the mixture was agitated at room temperature for 4 hours and then filtered for removal of Zeorum, to give a dehydrated 2-ethyloxazoline solution.

Then, 400 g of the dehydrated 2-ethyloxazoline solution prepared and 3.8 g of diethylsulfuric acid were placed in a four-necked flask equipped with a reflux condenser, a thermometer, a nitrogen-gas inlet tube and a stirrer; the internal air was substituted with dry nitrogen; and the mixture was agitated at 80° C. for 12 hours. The reaction solution was then cooled to 40° C. or lower; 6.2 g of N,N-dimethylaminoethyl methacrylate (Wako Pure Chemical Industries, Ltd. reagent) previously dehydrated with Zeorum was added thereto; the mixture was agitated at room temperature for 4 hours and then reprecipitated and recovered with a large volume of hexane, to give monoterminally methacryloyl-type poly(2-ethyloxazoline). The weight-average molecular weight thereof, as determined by GPC (solvent: chloroform), was 5000.

Preparative Example 10

Synthesis of Monoterminally methacryloyl-type poly(N,N-dimethylacrylamide)

50 g of N,N-dimethylacrylamide (DMAAm), 2.5 g of 3-mercaptopropionic acid (MPA), and 25 g of propylene glycol monomethylether acetate (PGMEA) were placed in a separable flask equipped with a reflux condenser, a thermometer, a nitrogen-gas inlet tube, and a stirrer, and after the internal air was substituted with nitrogen, 200 of DMAAm, 4 g of MPA, 100 g of PGMEA, and 2 g of 2,2'-azobis(2,4-dimethylvaleronitrile) (V-65; Wako Pure Chemical Industries, Ltd.) were added dropwise over 3 hours, while the mixture was agitated at 80° C. After agitation at 80° C. for one more hour, 2 g of V-65 g, 2 g of MPA and 125 g of PGMEA were added thereto. The mixture was agitated at 80° C. additionally for 2 hours, to give a terminal carboxylated poly (DMAAm) solution. 450 g of the terminal carboxylated poly (DMAAm) solution, 11.2 g of glycidyl methacrylate, 3.8 g of tetrabutylammonium bromide, 0.4 g of methoxyphenol, and 43 g of PGMEA were placed in a four-necked flask equipped with a reflux condenser, a thermometer, a air inlet tube and a stirrer; the mixture was agitated under air bubbling at 90° C. for 12 hours and then, reprecipitated and recovered with a large volume of hexane, to give a monoterminally methacryloyl-type poly(DMAAm). The weight-average molecular weight thereof, as determined by GPC (solvent: dimethylformamide containing 60 mmol/L phosphoric acid and 50 mmol/L lithium bromide, standard substance: polystyrene), was 8500.

Preparative Example 11

Synthesis of Monoterminally methacryloyl-type poly(N-vinylpyrrolidone)

120 g of N-vinylpyrrolidone (VP), 0.12 g of 3-mercaptopropionic acid (MPA), and 65 g of ethanol (EtOH) were placed in a separable flask equipped with a reflux condenser, a thermometer, a nitrogen-gas inlet tube and a stirrer, and after substitution with nitrogen, 0.12 g of V-65 and 5 g of EtOH were added thereto while the mixture was agitated at 60° C. 1.8 g of MPA, 170 g of EtOH, and 0.18 g of V-65 were added dropwise over 3.5 hours. After agitation at 60° C. additionally for 3 hours, the mixture was cooled and then, reprecipitated and recovered with a large volume of hexane, to give terminal carboxylated poly(VP). 90 g of the terminal carboxylated poly(VP), 2.1 g of glycidyl methacrylate, 0.7 g of tetrabutylammonium bromide, 0.07 g of methoxyphenol, and 135 g of N-methylpyrrolidone were placed in a four-necked flask equipped with a reflux condenser, a thermometer, air inlet tube and a stirrer and dissolved by agitation. The mixture was agitated at 100° C. for 72 hours under air bubbling, and then, reprecipitated and recovered with a large volume of hexane to give monoterminally methacryloyl-substituted poly(VP). The weight-average molecular weight thereof, as determined by GPC (solvent: chloroform containing 1 mmol/L Farmin DM20 (manufactured by Kao Corporation), standard substance: polystyrene), was 2400.

Example 5

10 g of the monoterminally methacryloyl-type poly(2-ethyloxazoline) synthesized in Preparative Example 9, 40 of methyl methacrylate (MMA, Wako Pure Chemical Industries, Ltd.), 1 g of V-65, and 33 g of ethyl acetate (Wako Pure Chemical Industries, Ltd.) were mixed and dissolved uniformly in a beaker, to give a monomer solution.

Then, 8 g of the monomer solution was placed in a separable flask equipped with a reflux condenser, a thermometer, a nitrogen-gas inlet tube and a stirrer, and the internal air was substituted with nitrogen. 75 g of the monomer solution was added dropwise over 2 hours while the mixture was agitated 70° C. After agitation at 70° C. additionally for 1 hour, the mixture was heated to 75° C., and 1 g of V-65 and 10 g of ethyl acetate were added thereto. After agitation at 75° C. additionally for 2 hours, the mixture was cooled, and then, reprecipitated and recovered with a large volume of hexane, to give a pigment dispersant of poly(methyl methacrylate-g-(2-ethyloxazoline)) (hereinafter, referred to as pigment dispersant 1). The weight-average molecular weight of the pigment dispersant 1, as determined by GPC (solvent: chloroform), was 25,000 (as polystyrene).

Example 6

20 g of the monoterminally methacryloyl-type poly(D-MAAm) synthesized in Preparative Example 10, 158 g of 45% monoterminally methacryloyl-type polymethyl methacrylate (PMMA macromonomer) toluene solution (45% AA-6, weight-average molecular weight: 12000, manufactured by Toagosei Co., Ltd.) (71 g as PMMA macromonomer), 9 g of MMA, 65 g of PGMEA, and 2 g of V-65 were mixed and dissolved uniformly in a beaker, to give a monomer solution.

Then, 25 g of the monomer solution was placed in a separable flask equipped with a reflux condenser, a thermometer, a nitrogen-gas inlet tube, and a stirrer, and the internal air was substituted with nitrogen. 223 g of the monomer solution was added dropwise over 3 hours, while the mixture was agitated at 80° C. After agitation at 80° C. additionally for 1 hour, 1 g of V-65 and 10 g of PGMEA were added thereto. After agitation at 80° C. additionally for 2 hours, the mixture was cooled, and then, reprecipitated and recovered with a large volume of hexane, to give a pigment dispersant of poly(methyl methacrylate-g-DMAAm-g-methyl methacrylate) (hereinafter, referred to as pigment dispersant 2). The weight-average molecular weight of the pigment dispersant 2, as determined by GPC (solvent: DMF-based), was 55000 (as polystyrene).

Example 7

15 g of the monoterminally methacryloyl-type poly(VP) synthesized in Preparative Example 11, 169 g of 45% PMMA macromonomer toluene solution (45% AA-6, weight-average molecular weight: 12000, manufactured by Toagosei Co., Ltd.) (76 g as PMMA macromonomer), 9 g of MMA, and 30 g of PGMEA were mixed and dissolved uniformly in a beaker, to give a monomer solution.

Then, 23 g of the monomer solution was placed in a separable flask equipped with a reflux condenser, a thermometer, a nitrogen-gas inlet tube and a stirrer, and the internal air was substituted with nitrogen. 200 g of the monomer solution was added dropwise over 3 hours, while the mixture was agitated at 80° C. After agitation at 80° C. additionally for 1 hour, 1 g of V-65 and 10 g of PGMEA were added thereto. After agitation at 80° C. additionally for 2 hours, the mixture was cooled and the, reprecipitated and recovered with a large volume of hexane, to give a pigment dispersant of poly(methyl methacrylate-g-VP-g-methyl methacrylate) (hereinafter, referred to as pigment dispersant 3). The weight-average molecular weight of the pigment dispersant 3, as determined by GPC (solvent: DMF-based), was 38000 (as polystyrene).

Comparative Example 4

45 g of N,N-dimethylacrylamide (DMAAm, Wako Pure Chemical Industries, Ltd.), 122 g of 45% PMMA macromonomer toluene solution (45% AA-6, weight-average molecular weight: 12,000, manufactured by Toagosei Co., Ltd.), 1 g of V-65 and 83 g of PGMEA were mixed and dissolved uniformly in a beaker, to give a monomer solution.

Then, 25 g of the monomer solution was placed in a separable flask equipped with a reflux condenser, a temperature, a nitrogen-gas inlet tube and a stirrer, and the internal air was substituted with nitrogen. After the nitrogen-gas inlet tube was replaced with a dropping funnel containing 225 g of the monomer solution, the monomer solution was added dropwise over 3 hours while the mixture was agitated at 80° C. After agitation at 80° C. additionally for 1 hour, 1 g of V-65 and 10 g of PGMEA were added thereto. After agitation at 80° C. additionally for 2 hours, obtained was a 40% solution of a pigment dispersant of poly(N,N-dimethylacrylamide-g-methyl methacrylate) (hereinafter, referred to as comparative pigment dispersant 1). The weight-average molecular weight of the comparative pigment dispersant 1, as determined by GPC (solvent: DMF-based), was 40000 (as polystyrene).

The compositions of the pigment dispersants obtained in Examples 5 to 7 and Comparative Example 4 are summarized in Table 3.

TABLE 3

|  |  | Example 5 | Example 6 | Example 7 | Comparative example 4 |
|---|---|---|---|---|---|
| Nitrogen-containing macromonomer (a) | Kind | Macromonomer in Preparative example 9 | Macromonomer in preparative example 10 | Macromonomer in preparative example 11 | — |
|  | Weight-average molecular weight | 5000 | 8500 | 2400 | — |
|  | wt parts | 20 | 20 | 15 | — |
| Monomer (b) | Kind | MMA | MMA | MMA | DMAAm |
|  | wt parts | 80 | 9 | 9 | 45 |
|  | Kind | — | PMMA macromonomer | PMMA macromonomer | PMMA macromonomer |
|  | wt parts | — | 71 | 76 | 55 |
| Weight-average molecular weight of pigment dispersant |  | 25000 | 55000 | 38000 | 40000 |

Example 8

17 g of C.I. Pigment Red 254, 6.8 g of the pigment dispersant 1, 66 g of PGMEA and 200 g of zirconia beads having a diameter of 0.3 mm are placed in a 250 cc plastic bottle, and the mixture was shaken in a paint shaker (manufactured by Asada Iron Works. Co., Ltd.) for 3 hours, to give a pigment dispersion composition.

Example 9

A pigment dispersion composition was prepared in a similar manner to Example 8, except that the pigment dispersant 1 was replaced with pigment dispersant 2.

Example 10

A pigment dispersion composition was prepared in a similar manner to Example 8, except that the pigment dispersant 1 was replaced with pigment dispersant 3.

Comparative Example 5

A pigment dispersion composition was prepared in a similar manner to Example 8, except that the pigment dispersant 1 was replaced with comparative pigment dispersant 1.

The diameters of the dispersion particles in the pigment dispersion compositions obtained in Examples 8 to 10 and Comparative Example 5 were determined by the following method. Results are summarized in Table 4.

The diameter of the dispersion particles diameter was determined as described above.

TABLE 4

|  | Example 8 | Example 9 | Example 10 | Comparative example 5 |
|---|---|---|---|---|
| Pigment dispersant | Pigment dispersant 1 | Pigment dispersant 2 | Pigment dispersant 3 | Comparative pigment dispersant 1 |
| Nonaqueous solvent | PGMEA | PGMEA | PGMEA | PGMEA |
| Particle diameter (μm) | 0.38 | 0.26 | 0.28 | 0.42 |

The results in Table 4 indicates that the pigment dispersants according to the present invention had fine dispersions of pigments in nonaqueous solvents.

The invention claimed is:

1. A pigment dispersant, comprising a copolymer (E) having the following constituent units (a) and (b):
   (a) a constituent unit derived from a nitrogen atom-containing polymerizable macromonomer having an ethylenic unsaturated double bond at one terminal, and
   (b) a constituent unit derived from a monomer having an ethylenic unsaturated double bond, being copolymerizable with the nitrogen atom-containing polymerizable macromonomer of constituent unit (a),
   wherein constituent unit (a) is a constituent unit derived from a poly(N-acyl-alkyleneimine) having a monoterminal (meth)acryloyl group, wherein the alkylene group has 2 to 3 carbon atoms.

2. The pigment dispersant according to claim 1, wherein the constituent unit (b) has a constituent unit derived from a polymerizable macromonomer having an ethylenic unsaturated double bond at one terminal, but no nitrogen atom.

3. The pigment dispersant according to claim 1, wherein the weight-average molecular weight of the copolymer (E) is 1,000 to 100,000.

4. The pigment dispersant according to claim 1, wherein the content of the constituent unit (a) is 1 to 70 wt %, based on all of the constituent units in copolymer (E).

5. The pigment dispersant according to claim 1, wherein the weight-average molecular weight of the nitrogen atom-containing polymerizable macromonomer of the constituent unit (a) is 300 to 30,000.

6. A pigment dispersion composition, comprising a pigment (A), a nonaqueous solvent (B), and the pigment dispersant according to claim 1.

7. The pigment dispersion composition according to claim 6, wherein the nonaqueous solvent (B) is propylene glycol monomethylether acetate.

8. The pigment dispersion composition according to claim 6, wherein the pigment (A) is a diketopyrrolopyrrole-based organic pigment.

9. The pigment dispersant according to claim 1, wherein copolymer (E) further comprises a constituent unit derived from at least one nitrogen atom-containing polymerizable macromonomer selected from the group consisting of a poly (N-alkyl (meth)acrylamide) having a monoterminal (meth) acryloyl group, a poly(N,N-dialkyl (meth)acrylamide) having a monoterminal (meth)acryloyl group, and a poly(N-vinylpyrrolidone) having a monoterminal (meth)acryloyl group.

10. A pigment dispersant, comprising a polymer (C) having the following constituent units (c1), (c2) and (c3):
   (c1) a constituent unit derived from a nitrogen atom-containing polymerizable macromonomer having an ethylenic unsaturated double bond at one terminal,
   (c2) a constituent unit derived from a polymerizable macromonomer having an ethylenic unsaturated double bond at one terminal, but no nitrogen atom, and
   (c3) a constituent unit derived from a monomer having an ethylenic unsaturated double bond, being copolymerizable with the macromonomer of constituent unit (c1) and the macromonomer of constituent unit (c2) and having a difference (ΔSP) in solubility parameter between the monomer and a nonaqueous solvent (B) of 1.0 or more,
   wherein constituent unit (c1) is a constituent unit derived from a poly(N-acyl-alkyleneimine) having a monoterminal (meth)acryloyl group, wherein the alkylene group has 2 to 3 carbon atoms.

11. The pigment dispersant according to claim 10, wherein polymer (C) further comprises a constituent unit derived from at least one nitrogen atom-containing polymerizable macromonomer selected from the group consisting of a poly(N-alkyl (meth)acrylamide) having a monoterminal (meth)acryloyl group, a poly(N,N-dialkyl (meth)acrylamide) having a monoterminal (meth)acryloyl group, and a poly(N-vinylpyrrolidone) having a monoterminal (meth)acryloyl group.

12. A pigment dispersion composition, comprising a pigment (A), a nonaqueous solvent (B), and a polymer (C) having the following constituent units (c1), (c2) and (c3):
   (c1) a constituent unit derived from a nitrogen atom-containing polymerizable macromonomer having an ethylenic unsaturated double bond at one terminal,
   (c2) a constituent unit derived from a polymerizable macromonomer having an ethylenic unsaturated double bond at one terminal, but no nitrogen atom, and
   (c3) a constituent unit derived from a monomer having an ethylenic unsaturated double bond, being copolymerizable with the macromonomer of constituent unit (c1)

and the macromonomer of constituent unit (c2) and having a difference ($\Delta$SP) in solubility parameter between the monomer and the nonaqueous solvent (B) of 1.0 or more, wherein constituent unit (c1) is a constituent unit derived from a poly(N-acyl-alkyleneimine) having a monoterminal (meth)acryloyl group, wherein the alkylene group has 2 to 3 carbon atoms.

13. The pigment dispersion composition according to claim 12, wherein the content of the constituent unit (c3) is 3 to 50 wt %, based on all of the constituent units in polymer (C).

14. The pigment dispersion composition according to claim 12, wherein the constituent unit (c3) is a constituent unit derived from an alcoholic hydroxyl group-containing (meth)acrylic ester.

15. The pigment dispersion composition according to claim 14, wherein the alcoholic hydroxyl group-containing (meth)acrylic ester is at least one compound selected from the group consisting of 2-hydroxyethyl methacrylate and glycerol monomethacrylate.

16. The pigment dispersion composition according to claim 12, wherein the nonaqueous solvent (B) is an alkylene glycol monomethylether acetate.

17. The pigment dispersion composition according to claim 12, wherein the pigment (A) is a diketopyrrolopyrrole-based pigment.

18. The pigment dispersion composition according to claim 12, wherein the polymer (C) is adsorbed on the surface of the pigment (A).

19. A method of producing the pigment dispersion composition according to claim 12, comprising:
   mixing the polymer (C), an organic solvent (D) capable of dissolving the polymer (C), and the pigment (A) to provide a mixture;
   adding the nonaqueous solvent (B) not capable of dissolving the polymer (C) to the mixture; and
   removing the organic solvent (D) from the mixture.

20. The pigment dispersant composition according to claim 12, wherein polymer (C) further comprises a constituent unit derived from at least one nitrogen atom-containing polymerizable macromonomer selected from the group consisting of a poly(N-alkyl (meth)acrylamide) having a monoterminal (meth)acryloyl group, a poly(N,N-dialkyl (meth)acrylamide) having a monoterminal (meth)acryloyl group, and a poly(N-vinylpyrrolidone) having a monoterminal (meth)acryloyl group.

* * * * *